Figure 1:
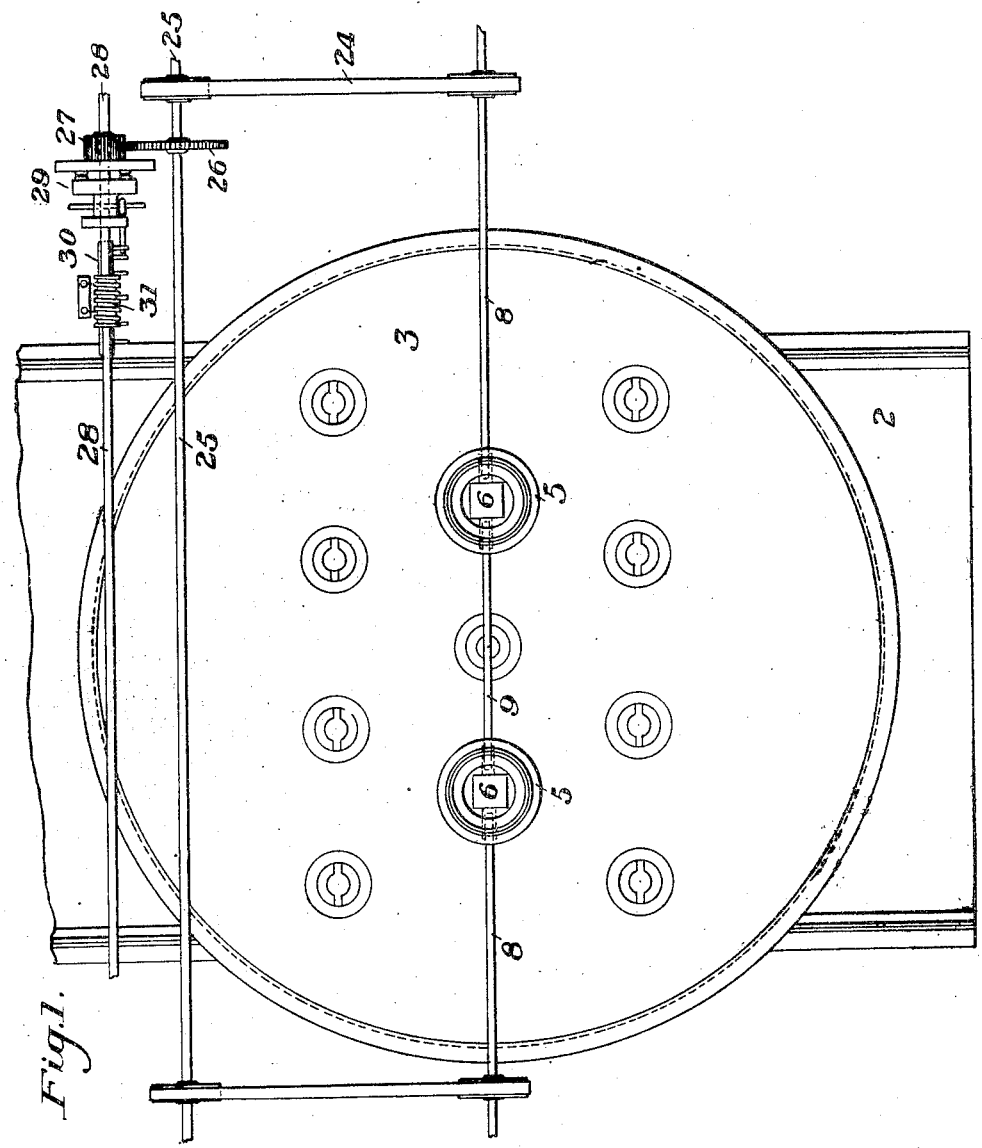

No. 893,432. PATENTED JULY 14, 1908.
W. H. BRADLEY.
APPARATUS FOR FEEDING FURNACES.
APPLICATION FILED APR. 4, 1907.

4 SHEETS—SHEET 1.

WITNESSES
R A Balderson
W. W. Swartz

INVENTOR
Wm. H. Bradley,
by Bakewell & Byrnes
his attys.

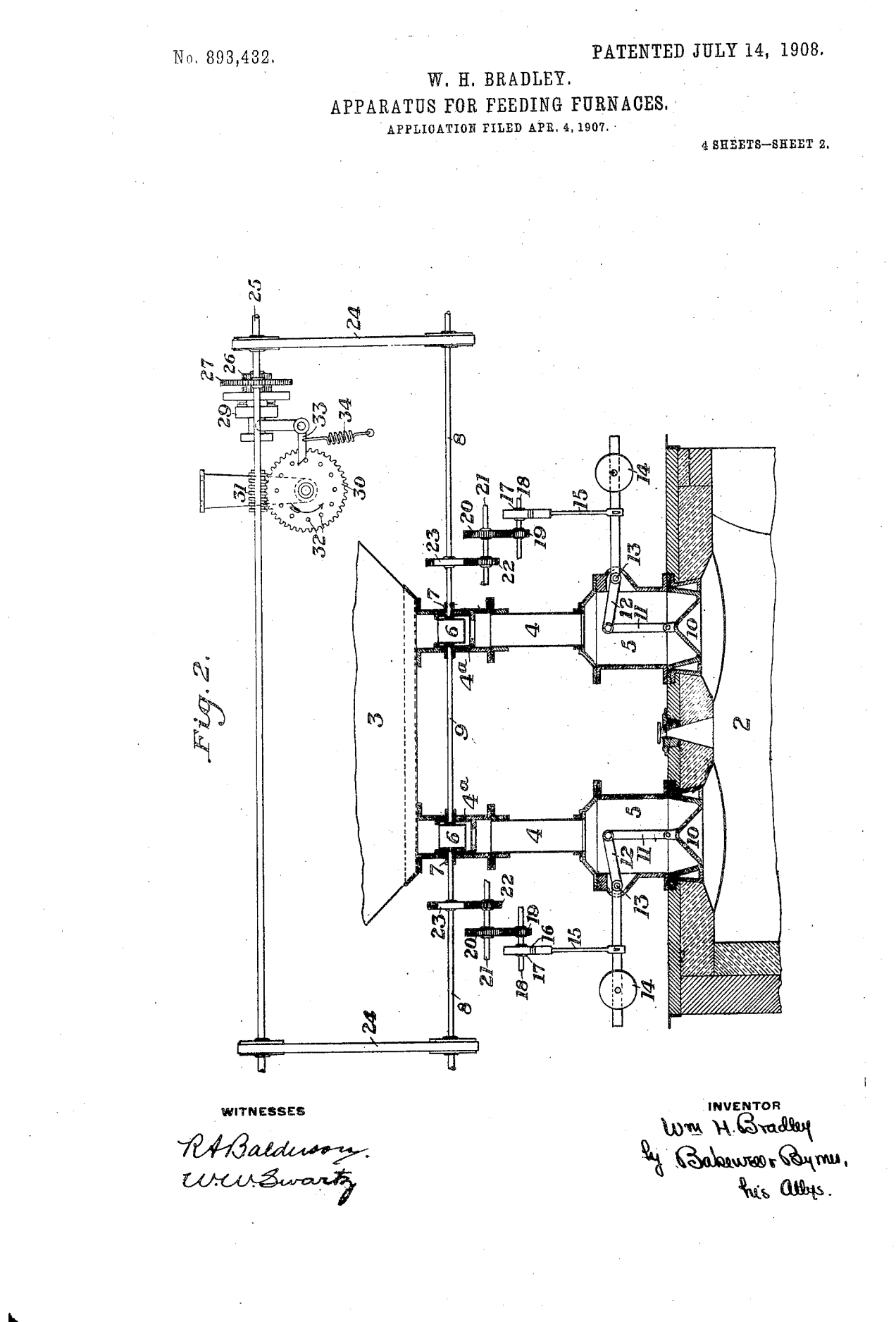

No. 893,432. PATENTED JULY 14, 1908.
W. H. BRADLEY.
APPARATUS FOR FEEDING FURNACES.
APPLICATION FILED APR. 4, 1907.

4 SHEETS—SHEET 2.

Fig. 2.

WITNESSES
R A Balderson
W. W. Swartz

INVENTOR
Wm H. Bradley
by Bakewell & Byrnes,
his Attys.

No. 893,432.
PATENTED JULY 14, 1908.
W. H. BRADLEY.
APPARATUS FOR FEEDING FURNACES.
APPLICATION FILED APR. 4, 1907.
4 SHEETS—SHEET 3.
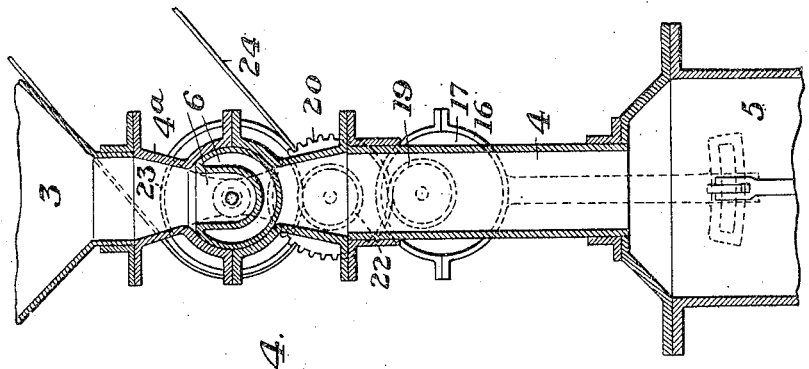
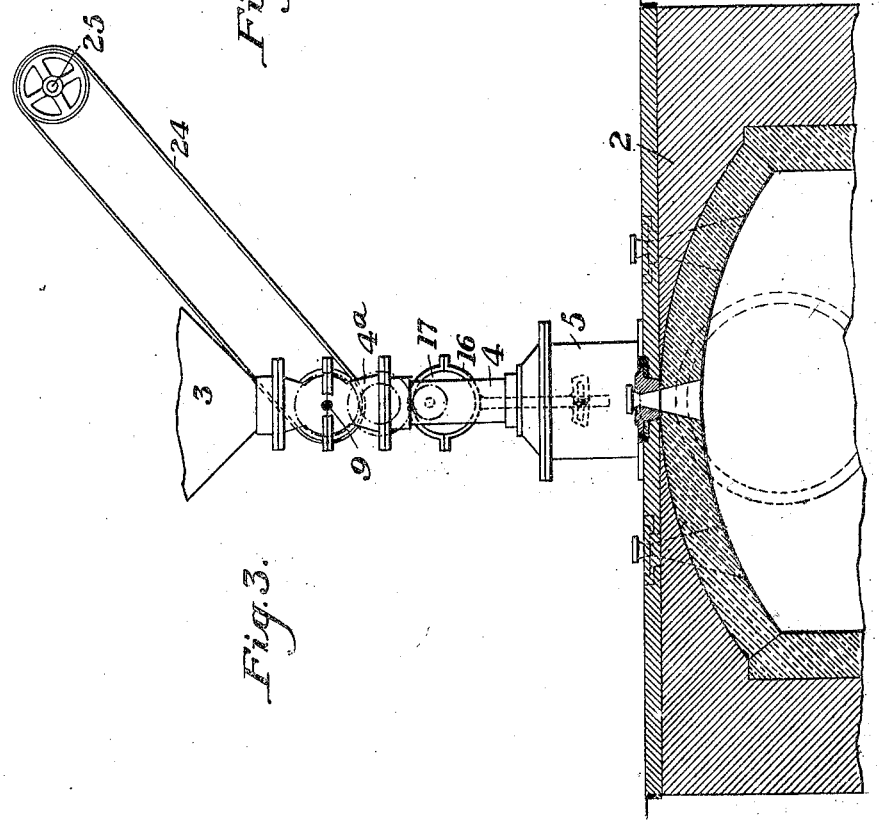
WITNESSES
INVENTOR

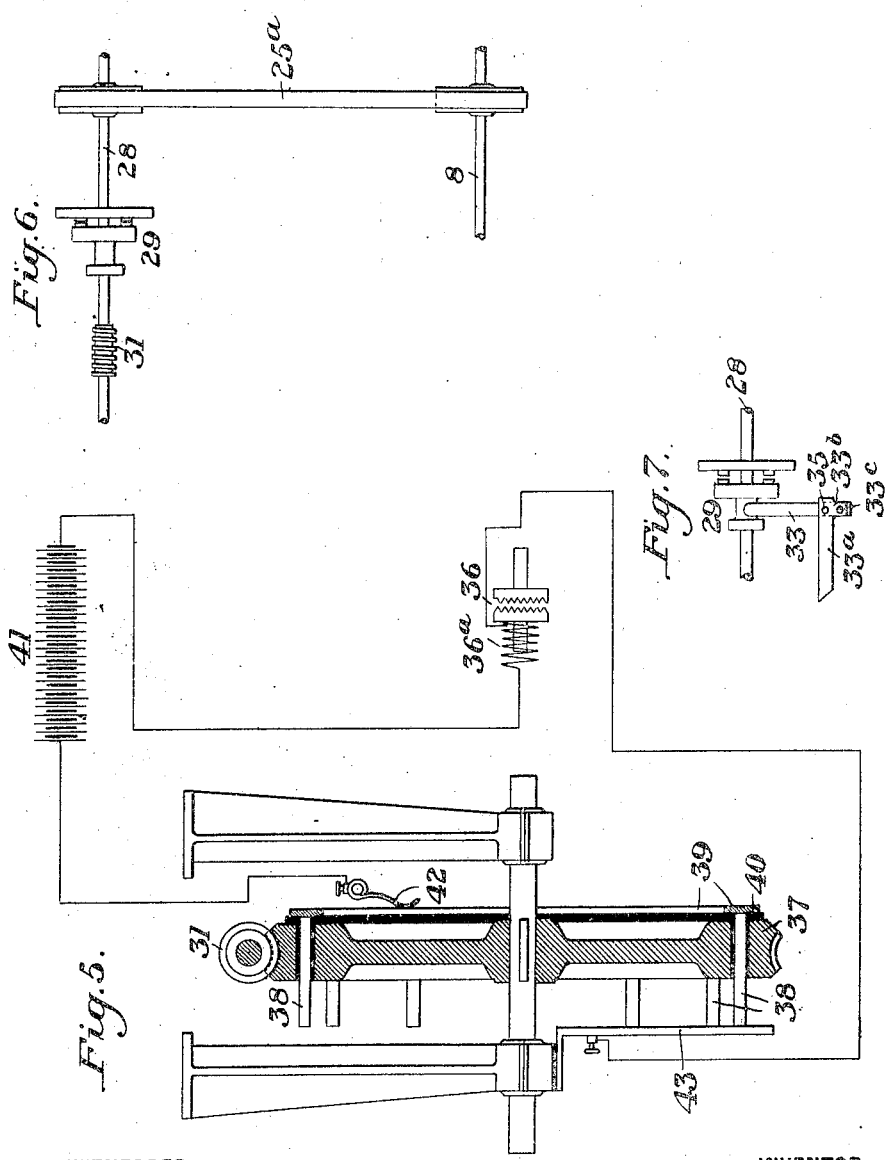

UNITED STATES PATENT OFFICE.

WILLIAM H. BRADLEY, OF BELLEVUE, PENNSYLVANIA.

APPARATUS FOR FEEDING FURNACES.

No. 893,432.      Specification of Letters Patent.      Patented July 14, 1908.

Application filed April 4, 1907. Serial No. 366,318.

*To all whom it may concern:*

Be it known that I, WILLIAM H. BRADLEY, of Bellevue, Allegheny county, Pennsylvania, have invented a new and useful Apparatus for Feeding Furnaces, of which the following is a full, clear, and exact description, reference being had to the accompanying drawings, forming part of this specification, in which—

Figure 1 is a plan view showing one form of my invention applied to a gas producer furnace; Fig. 2 is a central longitudinal section of the same, with the hopper partly broken away; Fig. 3 is a sectional elevation at right angles to the plane of Fig. 2; Fig. 4 is an enlarged vertical section through a portion of the hopper and through the feeding neck; Fig. 5 is a detail view partly in section and partly in diagram showing a modified form of controller; Fig. 6 is a detail view showing a modified form of gear connection; Fig. 7 is a detail view showing a modified form of clutch actuating device.

My invention has relation to apparatus for periodically feeding furnaces, and the like, and while I have shown the invention in connection with a gas producer furnace, it may be applied to other furnaces, wherever it is desired to periodically feed charges of fuel or other material.

The object of my invention is to provide simple and efficient means by which a charge of fuel may be periodically delivered to a furnace, the operation being controlled automatically; and the invention consists in the novel form of controller, the novel form of feeding mechanism controlled thereby, and certain other novel features of construction, combination and arrangement of parts, all as more fully hereinafter described and pointed out in the appended claims.

Referring to the accompanying drawings, the numeral 2 designates the upper portion of a gas producer furnace, which is supplied with fuel from a feed hopper 3 through the feeding necks 4, which communicate at their upper ends with the bottom of the hopper and which at their lower ends open into bell chambers 5. Each of the feeding necks 4 is provided with a cylindrical portion 4ª, in which is supported a rotary feeding pocket 6. This pocket is in the form of a cylinder, having a portion thereof cut away or removed, as best shown in Fig. 4, to provide a receptacle to receive fuel from the hopper 3. To the journals or trunnions 7 which support these pockets are secured driving shafts 8. In the particular arrangement shown, I have shown the driving shafts for the two pockets as connected by an intermediate shaft section 9, but this may be omitted if desired.

The bottom opening of each of the bell chambers 5, which communicates with the interior of the furnace, is normally closed by a vertically movable bell 10 supported by a rod 11 connected to a lever 12 fulcrumed at 13 and carrying a counterweight 14. The counterweighted arm of each of these levers is connected by link 15 with the strap 16 of an eccentric 17, which is carried by shaft 18. The shaft 18 has a pinion 19, which meshes with a spur gear wheel 20 on a shaft 21. The shaft 21 carries a pinion 22, which is arranged to be engaged by toothed segments of a mutilated or broken gear wheel 23 carried by the shaft 8 above referred to.

The shafts 8 are driven by belt or other connections 24 with a shaft 25, which carries a gear wheel 26 meshing with a pinion 27 on a shaft 28. The pinion 27 is normally loose on the shaft 28, and is arranged to be put into driving connection with such shaft by means of a sliding clutch member 29. 30 is a rotary wheel having peripheral worm teeth which are driven by a slow-motion worm or screw 31 on the shaft 28. The wheel 30 is provided with a series of projecting pins 32, spaced at equal distances from each other, and which are arranged to successively engage the end or one arm of a bell crank lever 33, the other arm of said lever being engaged with the sliding clutch member 29 before referred to. 34 is a spring connected to the bell crank lever 33 to actuate said lever, and the clutch member, in the reverse direction.

The operation is as follows:—The shaft 28 is driven at a slow speed so as to cause a slow revolution of the wheel 30. The speed at which this wheel is driven will depend upon the frequency of the operations to be controlled, and the number of the pins 32 carried thereby. As each pin comes in contact with the arm of the bell crank lever 33 it moves the clutch member 29 into clutching engagement with the pinion 27. This effects the rotation of the pinion 27, and thereby the rotation of the shaft 25 and the shafts 8. As the shafts 8 rotate, carrying with them the pockets 6 which have been filled with fuel from the hopper 3, said pockets are inverted and discharge their contents into the bell chambers 5, and into the bells 10. When this has been done, the toothed segments 23 come into mesh with the pinions 22, and through the gearing and connections described, oscillate the levers 12, thereby lowering the bell and discharging the fuel into the furnace. By using multiplying gearing as shown, the bells may be given a number of oscillations after each discharge of the pockets, so that the fuel will be thoroughly discharged from the bell chambers.

The purpose of the intermediate shaft 25 is to reduce the speed at which the shafts 8 are operated, but this shaft may be omitted and shafts 28 and 8 directly connected with each other by belt 25$^a$, or other connection, as shown in Fig. 6.

I preferably construct the bell crank lever 33 in the manner shown in Fig. 7, that is to say, the two arms of this lever are made separate, and are connected by a pivot pin 35. The arm 33$^a$ of this lever also has a heel or extension 33$^b$, through which, and also through the other arm of said lever, a pin 33$^c$, is inserted. If for any reason it is desired to throw the feeding apparatus out of operation, this can be readily done by removing the pin 33$^c$ so that the engagement of the pins 32 will simply move the arm 33$^a$ idly.

Instead of employing a mechanical clutch and mechanical actuating device, I may employ a magnetic clutch such as that indicated in diagram at 36 in Fig. 5. In this case the rotary controlling member 37, which is driven by the worm 31, is provided with a series of contact pins 38. These pins may be carried by a conductor ring 39, which, together with the pins, are insulated from the body of the wheel as shown at 40. Current is supplied to the ring 39 from a suitable source 41 by means of a contact device 42 bearing against the ring 39 and connected to one pole of the source. The other pole of the source is connected through the coil 36$^a$ of the clutch 36 to a relatively fixed contact 43.

As the wheel 37 is slowly revolved by the worm 31 (which may be driven in the same manner as the corresponding worm of Figs. 1 and 2) the pins 38 periodically engage the fixed contact 43. The circuit of the coil 36$^a$ is closed by each such contact, and when so energized, throws the clutch members into driving engagement. This clutch, it will be understood, controls the operation of the feeding pockets and bell-actuating means in the same manner as the clutch shown in Figs. 1 and 2. Any suitable or well-known form of electro-magnetic clutch may be employed.

It will be seen that the member 30 of Fig. 1 and the member 37 of Fig. 5, constitute each a controlling or governing means for the feeding devices, and upon which the operation of said devices depends.

The advantages of my invention result from the means employed for automatically and periodically delivering successive charges to the bell chambers, after which the bells are actuated automatically to deliver the charge into the furnace. By the use of the controller, all of these operations are effected without the attendance of an operator, and are rendered fixed and certain.

Various changes may be made by those skilled in the art without departing from the spirit and scope of my invention. Thus, the particular arrangement of the feeding devices may be changed; the form and arrangement of the gearing for actuating the same may be varied, and other forms of controllers may be employed.

What I claim is:—

1. In furnace-feeding apparatus, a feed passage, means for delivering charges of fuel to the furnace through said feed passage, gearing for actuating the delivery means, a clutch for throwing the gearing into and out of operation, a controller, means for constantly rotating the controller at a relatively slow speed, and connections actuated by the controller whereby the clutch will be actuated periodically a plurality of times during each revolution of the controller, substantially as described.

2. In furnace feeding apparatus, a fuel passage, means for delivering charges of fuel to said passage, a constantly rotating member actuating means therefor, mechanism for actuating the delivery means, actuating connections between such mechanism and the constantly driven member, a clutch for controlling the actuating connections, and a governor actuated by the constantly driven member and having connections for controlling the said clutch, said governor being arranged to effect the periodical actuation of the clutch a plurality of times during each revolution of the controller; substantially as described.

3. In furnace-feeding apparatus, a feed passage, means for delivering charges of fuel to the furnace through said feed passage, gearing for actuating the delivery means, a clutch for throwing the gearing into and out of operation, a controller, means for constantly rotating the controller at a relatively slow speed, and connections actuated by the controller whereby the clutch will be actuated periodically a plurality of times during each revolution of the controller, together with a furnace closing device below the delivery means, and operating connections therefor whereby said closure is operated periodically and relatively with reference to the operation of the delivery means; substantially as described.

In testimony whereof, I have hereunto set my hand.

WILLIAM H. BRADLEY.

Witnesses:
  GEO. B. BLEMING,
  GEO. H. PARMELEE.